United States Patent [19]

Shiozaki

[11] Patent Number: 4,554,599
[45] Date of Patent: Nov. 19, 1985

[54] CASSETTE TAPE REPRODUCTION CONTROL ARRANGEMENT

[75] Inventor: Syuji Shiozaki, Hyogo, Japan

[73] Assignee: Fujitsu Ten Limited, Kobe, Japan

[21] Appl. No.: 506,884

[22] Filed: Jun. 21, 1983

[30] Foreign Application Priority Data

Jun. 21, 1982 [JP] Japan .................................. 57-107379
Oct. 27, 1982 [JP] Japan .................................. 57-189929

[51] Int. Cl.⁴ .......................................... G11B 5/008
[52] U.S. Cl. ...................................... 360/69; 242/199;
360/71; 360/93; 360/96.5; 360/132
[58] Field of Search ...................... 360/132, 69, 71, 93,
360/96.5; 242/199

[56] References Cited

U.S. PATENT DOCUMENTS

| | | | |
|---|---|---|---|
| 3,601,555 | 8/1971 | Peterson | 179/100.1 PS |
| 3,601,558 | 8/1971 | Sugaya et al. | 179/100.2 Z |
| 3,617,067 | 11/1971 | Ban | 360/132 |
| 3,701,860 | 10/1972 | Iwawaki et al. | 179/100.2 F |
| 3,711,654 | 1/1973 | Yoshikawa et al. | 360/132 |
| 3,764,754 | 10/1973 | Mizumoto | 179/100.2 CA |
| 3,800,324 | 3/1974 | Nakamichi | 360/96 |
| 3,800,327 | 3/1974 | Okita et al. | 360/105 |
| 4,012,011 | 3/1977 | Saito | 242/199 |
| 4,117,605 | 10/1978 | Kurland et al. | 35/9 A |
| 4,254,922 | 3/1981 | Wolf et al. | 242/194 |
| 4,280,136 | 7/1981 | Kashima et al. | 358/93 |
| 4,338,644 | 7/1982 | Staar | 360/132 |
| 4,339,776 | 7/1982 | Langer et al. | 360/69 |

FOREIGN PATENT DOCUMENTS

| | | | |
|---|---|---|---|
| 2461299 | 1/1981 | France | 360/132 |
| 55-146612 | 11/1980 | Japan | 360/132 |

OTHER PUBLICATIONS

IBM Technical Disclosure Bulletin, vol. 25, No. 4, Sep. 1982, pp. 1980–1981, Low Cost Cartridge Code Detector, J. A. Craft.

Primary Examiner—George G. Stellar
Attorney, Agent, or Firm—Wenderoth, Lind & Ponack

[57] ABSTRACT

A reproduction control arrangement for a cassette tape deck, in which recording and reproduction are performed by a cassette half having a magnetic tape being mounted on the deck. The control arrangement includes a recording area having control information for record/reproduction of the magnetic tape and being provided on the surface of the cassette half parallel to the direction in which the cassette half is attached to or discharged from the deck; detecting means for detecting the recording area during the cassette tape being mounted on the cassette deck; and a processing unit for controlling reproduction of the cassette tape according to the control information recorded in the recording area. A magnetic recording piece or an optical detectable sheet attached on the surface of the cassette half is used for the recording area.

25 Claims, 9 Drawing Figures

CASSETTE TAPE REPRODUCTION CONTROL ARRANGEMENT

BACKGROUND OF THE INVENTION

1. Field of the Invention

The present invention generally relates to a magnetic tape recording and reproducing arrangement and more particularly, to a cassette tape reproduction control arrangement for use in a tape deck or the like.

2. Description of Prior Arts

Conventionally, in a tape deck or the like, it has been a common practice to effect various controls such as recording, reproduction, fast forwarding, rewinding, stopping, etc. mainly by a mechanical arrangement through manual operations. Since the tape deck of the above described type requires the manual control as stated above, not only the construction thereof is complicated, but efficiency in operation has been undesirably lowered, with the troublesome manual procedures being required.

Accordingly, a primary object of the present invention is to provide an improved cassette tape reproduction control arrangement which is capable of automatically effecting various controls of a tape deck during reproduction of each cassette tape through employment of a control unit which may be realized by a micro-computer or the like so as to substantially eliminate troublesome procedures required for operations in the conventional arrangements of this kind.

Another important object of the present invention is to provide a cassette tape reproduction control arrangement of the above described type which is simple in construction and highly reliable in functioning, and may be readily manufactured at low cost.

SUMMARY OF THE INVENTION

To accomplish the foregoing objectives, there is provided an improved reproduction control arrangement for a cassette tape.

The cassette tape reproduction control arrangement according to the present invention includes a magnetic recording piece which is fixed to a cassette half of the cassette tape and in which control information for a tape deck during reproduction of the cassette tape is written, a magnetic head for reading out the control information, which is brought into contact with the magnetic recording piece when the cassette tape is displaced for mounting by automatic loading mechanism, and a processing unit for controlling the reproduction of the cassette tape based on the above control information.

According to the present invention, since it is so arranged that the magnetic recording piece in which the information for controlling the tape deck during the reproduction of the cassette tape is written, is fixed to the surface of the cassette half, with the magnetic head for reading-in the information of this magnetic recording piece being coupled with the reproduction control arrangement for the tape deck, the reproduction of the cassette tape may be automatically effected by the simple procedure merely to mount the cassette tape onto the tape deck.

According to the preferred embodiment of the present invention, the tape deck is provided with means for providing cassette tape reproduction control information to the magnetic recording piece when the cassette tape is recorded. When the cassette tape is discharged by automatic loading mechanism, the control information is written in the magnetic recording piece by the magnetic head.

The arrangement also includes a portion composed of a plurality of parts provided on the surface of the cassette half along the direction in which the cassette tape is attached to or discharged from the cassette deck. The reproduction control information is written in the portion, and is read out by the optical detecting means provided in the face of the portion during the cassette tape being put in place by the automatic loading mechanism. A processing unit of the arrangement controls the reproduction of the cassette tape according to the reproduction control information from the optical detecting device.

Owing to the arrangement of the present invention that the reproduction control information for the cassette tape is indicated on the cassette half, an improved cassette tape reproduction control arrangement capable of automatically effecting the reproduction control during reproduction of cassette tapes has been provided through simple construction.

DESCRIPTION OF PREFERRED EMBODIMENTS

Figure 1:
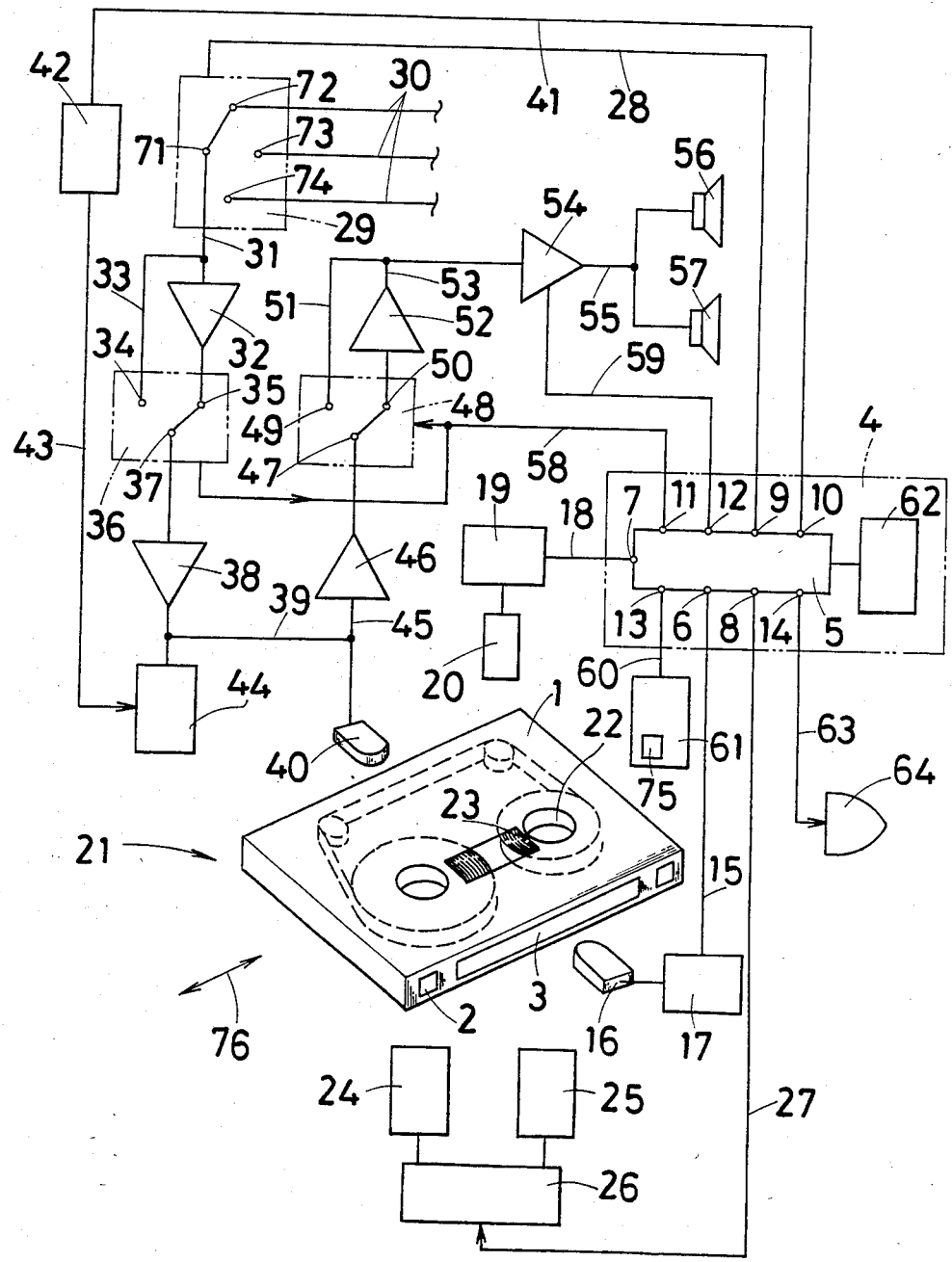
FIG. 1 is a schematic block diagram of a tape deck according to one preferred embodiment of the present invention with a perspective view of a cassette tape to be employed in the tape deck.

Referring now to the drawings, preferred embodiments of the present invention will be described hereinbelow.

In FIG. 1, there is shown a simplified block diagram of a tape deck with a cassette tape 21 which may be employed in said tape deck according to one preferred embodiment of the present invention. On a cassette half 1 of the cassette tape 21, at a rear side face thereof where safety tabs for preventing erroneous erasing are provided, there is fixed a magnetic recording piece 3 which may be realized by a magnetic tape or the like.

The tape deck as shown in FIG. 1 is provided with a control unit 4 which may be realized by a micro-computer and the like and includes a processing unit 5, ports 6, 7, 8, 9, 10, 11, 12, 13 and 14 connected to the processing unit 5, and a key input unit 62 also coupled to said processing unit 5. The respective ports 6 to 14 are connected to various parts of the tape deck in a manner as described later.

The port 6 is connected through a line 15 to a magnetic head 16 for writing information into the magnetic recording piece 3 and also reading the information therefrom. The magnetic head 16 as referred to above is brought into contact with the magnetic recording piece 3 during driving of an automatic loading mechanism 61. Between the magnetic head 16 and the port 6, there is interposed an interface 17, by which digital signal from the port 6 is coded to be applied to the magnetic head 16, and the coded signal from the magnetic head 16 is converted into digital signal for input to the port 6.

The port 7 is connected through a line 18 to a file search unit 19, to which a wound diameter search sensor 20 is connected. By the wound diameter search sensor 20, an external diameter i.e. diameter of the magnetic tape 23 wound onto one reel 22 of the cassette tape 21 is detected.

Meanwhile, the port 8 is connected, through a line 27, to a motor control unit 26 which controls a motor 24 for driving a capstan (not shown) of the tape deck to rotate, and a motor 25 for driving a reel base (not shown) for the fast forwarding and rewinding. Accordingly, by the signal fed from the port 8 to the motor control unit 26, the motor 24 is driven during reproduction of the cassette tape, while the motor 25 is driven during the fast forwarding and rewinding.

The port 9 is connected, through a line 28, to a selector switch 29, and the mode of selection by the selector switch 29 is applied to the port 9. By the selection of the selector switch 29, audio signal available from an external phonographic disc, magnetic tape or the like is input to said selector switch through lines 30. The selector switch 29 as described above has a common contact 71 and separate contacts 72, 73 and 74, and is connected to a line 31, to which a noise suppressing circuit 32 and a line 33 are connected in parallel. The line 33 is connected to a separate contact 34, while the noise suppressing circuit 32 is coupled to a separate contact 35. Meanwhile, a switch 36 has a common contact 37 and the separate contacts 34 and 35. The input signal from the common contact 37 is applied from a line 39 to a magnetic head 40 through a recording amplification circuit 38. Accordingly, during recording of the cassette tape 21, recording is effected to the magnetic tape 23 by the recording head 40.

The port 10 is connected through a line 41, to a tape kind selection circuit 42, which is selected corresponding to the kinds of the magnetic tape, for example, the normal tape, ferro-chrome tape, chrome-oxide tape, or metal tape so as to correspondingly output signal to an oscillator 44 through a line 43. Accordingly, at the oscillator 44, bias current corresponding to the kind of the magnetic tape 23 is applied to the line 39 according to the mode of selection by the tape kind selection circuit 42.

To the magnetic head 40, a line 45 is connected in parallel relation with the line 39. An equalizer circuit 46 is connected to the line 45, while said equalizer circuit 46 is connected to a common contact 47 of a switch 48, which is provided with the common contact 47 and separate contacts 49 and 50. The separate contact 49 is connected to a line 51. To the separate contact 50, there is connected another noise suppressing circuit 52, which is further connected to a line 53. This line 53 and the line 51 described earlier are connected in parallel to an amplification circuit 54, to which left and right speakers 56 and 57 are connected through a line 55.

On the other hand, the port 11 is connected to the switches 36 and 48 through a line 58. These switches 36 and 48 are arranged to be changed over in association with each other, and when the common contact 37 and separate contact 35 of the switch 36 are connected to each other, the common contact 47 and separate contact 50 of the switch 48 are also connected to each other. The port 12 is connected to the amplification 54 described earlier through a line 59.

The port 13 is connected to an automatic loading mechanism 61 through a line 60. By the driving of this automatic loading mechanism 61, the cassette tape 21 is displaced in a direction indicated by an arrow 76. The port 14 is connected, through a line 63, to a display unit 64 which may be realized by a cathode ray tube or the like. In this display unit 64, information (to be mentioned later) stored in the processing unit 5 is displayed.

In this embodiment, the magnetic head 16 is brought into contact with the magnetic recordinq piece 3 for the purpose of reading out the information in the magnetic recording piece during driving of an automatic loading mechanism 61. Employing automatic loading mechanism 61 is preferable, since the magnetic head 16 reads out the information when the cassette tape is displaced in a predetermined rate.

The magnetic recording piece 3 indicating the control information may be provided at any place on the surface of the cassette half 1 if it is provided parallel to the displaced direction of the cassette tape.

Figure 2:
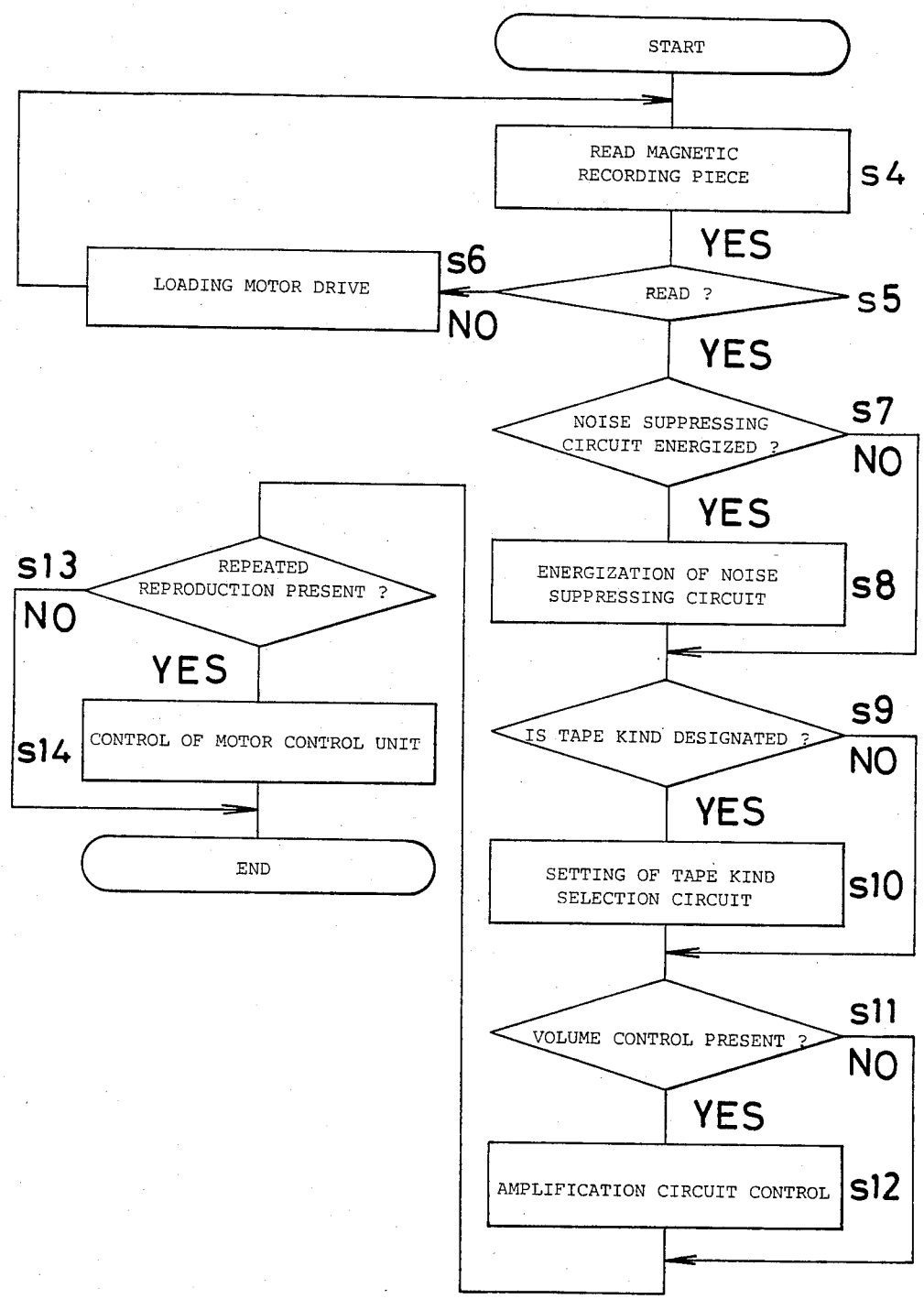
FIG. 2 is a simplified flow-chart explanatory of control functionings for the tape deck during reproduction of the cassette tape related to the present invention.

Reference is also made to FIG. 2 showing a simplified flow-chart for explaining control functions of the tape deck during reproduction of the cassette tape 21 in accordance with the present invention.

In a step s4, when the cassette tape 21 is inserted into the tape deck, and is subjected to the automatic loading by the automatic loading mechanism 61, the signal for reading out the information written in the magnetic recording piece 3 is applied to the port 6 by the processing unit 5 which receives the signal from the port 13, whereby the magnetic head 16 is brought in contact with the magnetic recording piece 3 to read out the information written in said magnetic recording piece 3 for input to the interface 17. From said interface 17, the information is applied to the port 6 through the line 15.

In a step s5, it is judged whether or not the information of the magnetic recording piece 3 is correctly input to the port 6 by the processing unit 5. If the information of the magnetic recording piece 3 is not correctly input, signal is applied from the port 13 to the automatic loading mechanism 61 through a line 60 at a step s6 so that a loading motor 75 is again driven, whereby the step s4 is again repeated.

When the information of the magnetic recording piece 3 has been correctly applied to the port 6, judgement is made, at a step s7, as to whether or not the noise suppressing circuit 52 is energized at the processing unit 5, and if said noise suppressing circuit 52 is not energized, the step is shifted to a step s9. At the step s7, if the energization of the noise suppressing circuit 52 is judged, signal for connecting the common contact 47 with the separate contact 50 is output from the port 11 to the switch 48 through the line 58 at a step s8.

At a step s9, it is judged whether or not the kind of the magnetic tape 23 is designated at the processing unit 5, whereby, at a step s10, the signal for selecting the selection mode corresponding to the kinds of the respective tape 23 is input from the port 10 to the tape kind selection circuit 42, and thus, the bias current from the oscillator 44 is applied according to the kind of the magnetic tape 23.

At a step s11, judgement is made as to whether or not volume control is required at the processing unit 5, whereby at a step s12, volume control signal for the left and right speakers 56 and 57 is applied from the port 12 to the amplification circuit 54 through the line 59. Accordingly, such control, for example, that only the left side speaker 56 is driven or the volume for the right side speaker 57 is increased is effected.

At a step s13, it is judged whether or not each of the zones recorded on the magnetic tape 23 is repeatedly reproduced. If the reproduction is repeatedly effected, signal for driving the motor 25 for rotating the reel base which releasably receives the reel 22 of the cassette tape 21 for rotation thereof is output at a step s14, from the port 8 to the motor control unit 26, whereby the magnetic tape 23 is rewound to effect repeated reproduction.

During reproduction of the cassette tape 21, the information which is obtained by detecting a non-recorded zone formed between the respective recorded zones, from the amplification circuit 54, and applied to the port, and the information for the wound diameter of the tape from the file search unit 19 to be input to the port 7, are applied to the processing unit 5, whereby at the processing unit 5, it is judged which of the recorded zones of the magnetic tape 23 is reproduced. According to the above judgement, signals produced from the ports 12 and 8 are controlled at the step s12 and s14.

Figure 3:
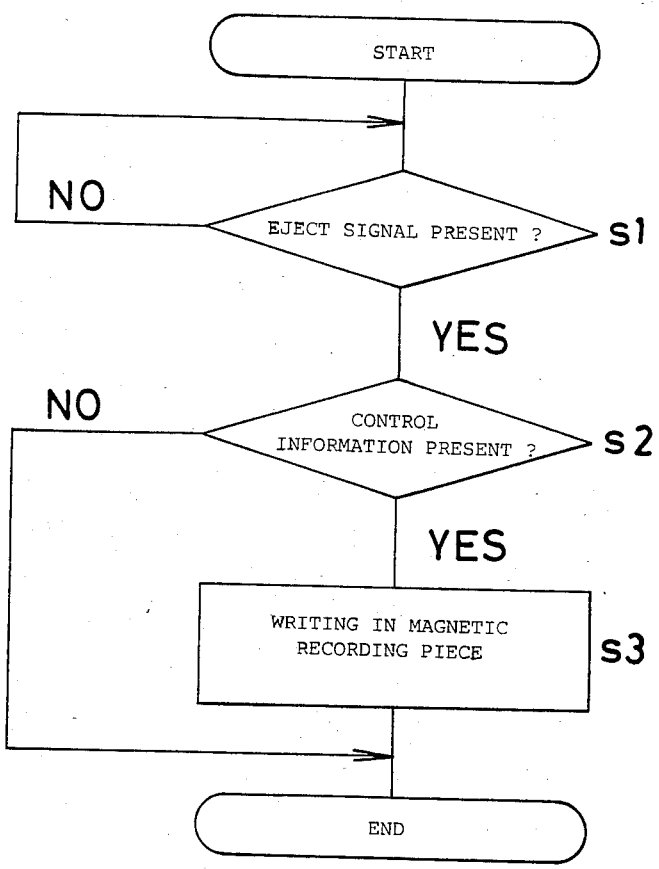
FIG. 3 is also a simplified flow-chart explanatory of information write-in functions for the control of the tape deck related to the present invention.

FIG. 3 shows a simplified flow-chart explanatory of the function for writing-in the information to effect control of the tape deck according to the present invention.

At a step s1, it is judged, at the processing unit 5, whether or not an eject signal for discharging the cassette tape 21 completed for recording out of the tape deck, is input to the port 13 by the automatic loading mechanism 61. When the eject signal is input, judgement is made, at a step s2, as to whether or not control information required for the reproduction of the cassette tape 21 is stored in the processing unit 5 during recording. When the information is not stored therein, signal is applied from the port 13 to the automatic loading mechanism 61 through the line 60 so as to drive the loading motor 25, whereby the cassette tape 21 is discharged out of the tape deck without the information written in the magnetic recording piece 3.

When the recording is to be made on the cassette tape 21 by the tape deck according to the present invention, signal corresponding to the selection mode of the selector switch 29 is applied to the port 9 through the line 28. Meanwhile, in this case, signal indicative of whether or not the noise suppressing circuit 32 is energized by the switch 36 mentioned earlier, is applied to the port 11 through the line 58. To the port 10, signal corresponding to the selection mode of the earlier described tape kind selection circuit 42 is applied through the line 41. Moreover, in this case, the detection signal for the wound diameter of the magnetic tape 23 from the wound diameter sensor 20 is applied to the port 7. The signals applied to the ports 9, 11, 10 and 7 as described so far are stored in the processing unit 5 as the information for controlling the tape deck during reproduction of the cassette tape 21. Furthermore, information, for example, of the volume control of the left and right speakers 56 and 57 during reproduction of the cassette tape 21 applied by the key input unit 62, and information for the number of repeated reproductions for each recording zone, etc. are stored in the processing unit 5 together with the information described earlier.

At a step s3, in the case where the information is stored in the processing unit 5, signal is input to the automatic loading mechanism 61 from the port 13 through the line 60, and when the cassette tape 21 is moved to be discharged thereby, the magnetic head 16 is brought into contact with the magnetic recording piece 3, and the information stored in the processing unit 5 from the port 6 through the line 15 is written into the magnetic recording piece 3 via the interface 17 described earlier. Upon completion of the writing-in of this information, the cassette tape 21 is discharged out of the tape deck.

In the embodiment as described so far, although the reproduction information of the cassette tape 21 is adapted to be input during recording period of said cassette tape 21, according to another embodiment of the present invention, it may be so arranged that the reproduction information of the cassette tape 21 is input from the key input unit 62 during reproduction of the cassette tape 21 so as to be recorded on the magnetic recording piece 3.

Figure 4:
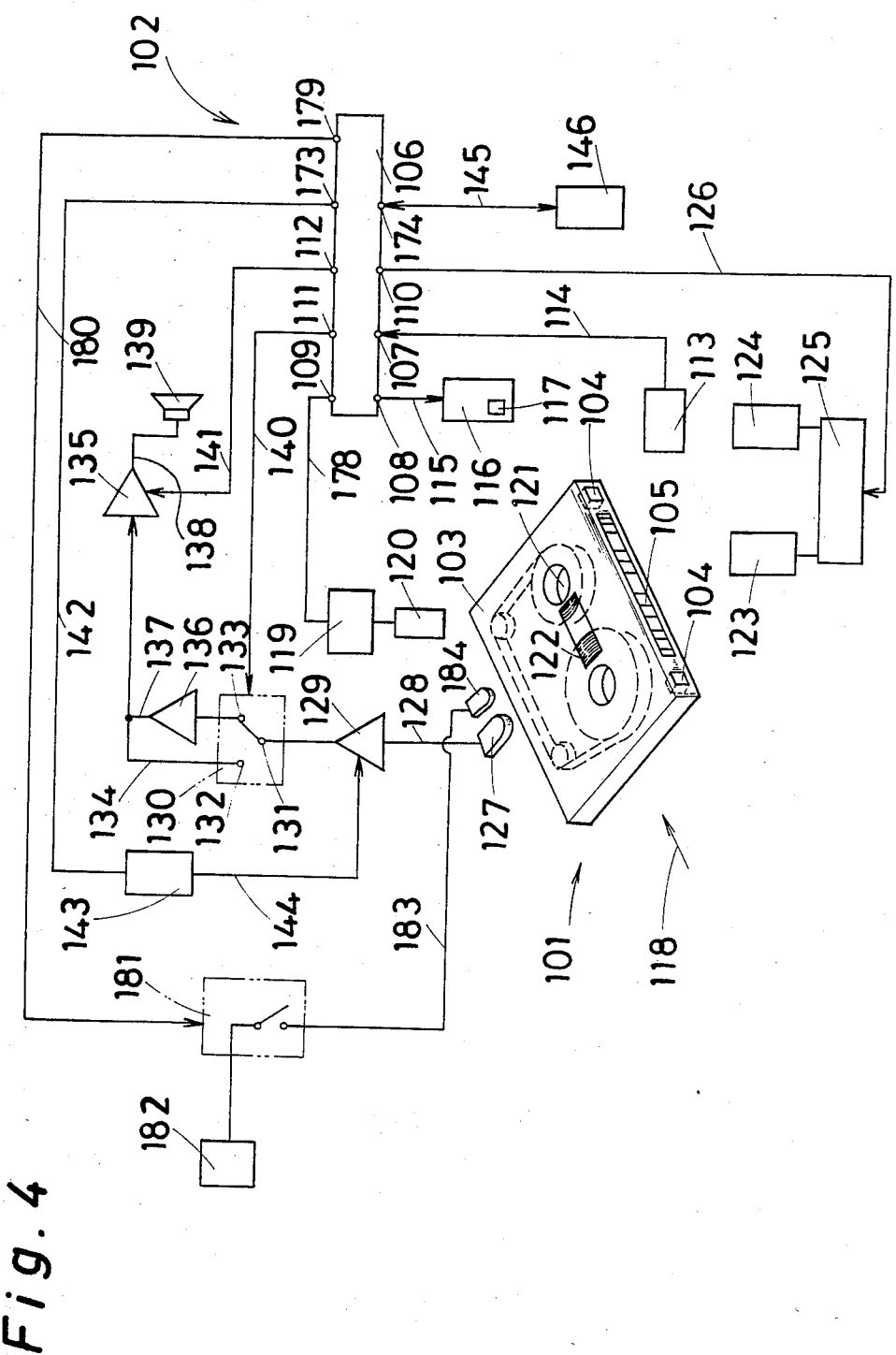
FIG. 4 is a schematic block diagram of a tape deck according to another embodiment of the present invention with a perspective view of a cassette tape to be employed in the tape deck.

Reference is further made to FIG. 4 showing a simplified block diagram of a reproduction control arrangement 102 together with a perspective view of a cassette tape 101 according to another embodiment of the present invention. The cassette half 103 of the cassette tape 101 has a portion 105 to be detected, applied on its rear side face where the safety tabs 104 for preventing erroneous recording are provided. The tape deck i.e. reproduction control arrangement 102 is provided with a processing unit 106 which may be realized by a microcomputer or the like. The processing unit 106 described above includes ports 107, 108, 109, 110, 111, 112, 173, 174 and 179 which are respectively connected to various parts of the reproduction control arrangement 102 in a manner as described later.

The port 107 is connected, through a line 114, to an optical detecting means 113 realized by a reflection type photo-sensor or the like for reading out the control information of the tape deck indicated in said portion 105 to be detected. The port 108 is coupled, through a line 115, to an automatic loading mechanism 116. Upon driving of a loading motor 117, the above automatic loading mechanism 116 displaces the cassette tape 101 for mounting in a direction indicated by an arrow 118. The optical detecting means 113 as described earlier confronts the earlier-mentioned portion 105 to be detected, during driving of the automatic loading mechanism 116 to read out the control information, which is applied to the processing unit 106 through the line 114.

The port 109 is connected, through a line 178, to a file search unit 119, and a wound diameter search sensor 120 is further coupled to said file search unit 119. By this wound diameter search sensor 120, the external diameter i.e. wound diameter of the magnetic tape 122 wound onto a reel 121 of the cassette tape 101 is detected. By the above detection, the amount of reproduction of the magnetic tape 122 of the cassette tape 101 is obtained at the processing unit 106. Meanwhile, the port 110 is connected, through a line 126, to a motor control unit 125 for controlling a motor 123 which drives for rotation a capstan (not shown) of the reproduction control unit 102, and a motor 124 which drives for rotation a reel base (not shown) for fast forwarding and rewinding.

The magnetic head 127 for reproducing the cassette tape 101 is coupled, through a line 128, to an equalizer circuit 129, which is connected to a common contact 131 of a switch 130. The switch 130 has the common contact 131 and separate contacts 132 and 133. The separate contact 132 is connected, through a line 134, to an amplification circuit 135, while the separate contact 133 is coupled to a noise suppressing circuit 136. The noise suppressing circuit 136 is connected to the amplification circuit 135 through a line 137 in a parallel relation with respect to the line 134. The amplification circuit 135 is connected to a speaker 139 through a line 138.

Based on the control information of the processing unit 106, the port 111 applies a changeover signal for the switching mode to the switch 130 through a line 140. The port 112 applies the signal for controlling sound volume to the amplification circuit 135 through a line 141 according to the control information of the processing unit 106.

The port 173 is connected, through a line 142, to a tape kind selection circuit 143. According to the control information of the processing unit 106, the above tape kind selection circuit 143 is selected in correspondence to the kinds of the magnetic tape 122, for example, normal tape, ferro-chrome tape, chrome-oxide tape or metal tape, according to which, signal is applied to the equalizer circuit 129 through a line 144, whereby at said equalizer circuit 129, equalizer characteristics corresponding to the kind of the magnetic tape 122 is selected.

The port 179 is connected, through a line 180, to a recording circuit 181. The recording circuit 181 is connected to sound reproduction equipments 182 such as radio and television set, and is also connected, through a line 183, to a recording head 184. The optical detecting means 113 detects the safety tabs 104 by emitting light, and provides a signal to the processing unit 106 through the line 114. When the safety tabs 104 are not present, the optical detecting means 113 does not provide the signal, and thus the sound reproduction equipment 182 is not connected to the recording head 184 by the recording circuit 181. Therefore, recording is not carried out. When the safety tabs 104 are present, recording is carried out since the optical detecting means 113 provides a signal so that the sound reproduction equipment 182 is connected to the recording head 184 by the recording circuit 181.

Figure 5:
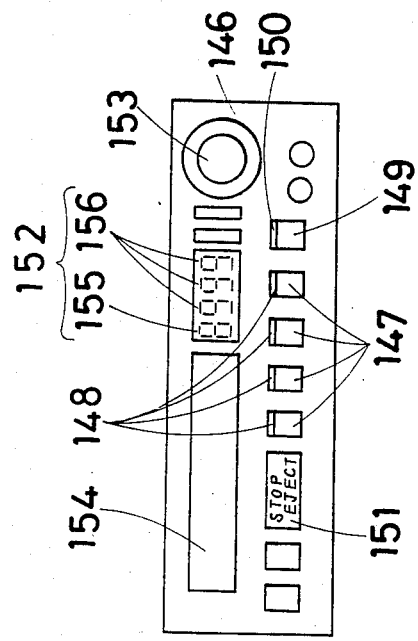
FIG. 5 is a fragmentary front elevational view of a display and control section employed in the arrangement of FIG. 4.

The port 174 is connected, through a line 145, to a display control section 146 provided at the front face of the reproduction control arrangement 102 as shown in FIG. 5. At the display control section 146, there are provided tape kind selector switches 147 in the manual operation, indicator lamps 148 for indicating the selection of the tape kind, a switch 149 for energizing the noise suppressing circuit 136 in the manual operation, an indicator lamp 150 for indicating the state of energization of the noise suppressing circuit 136, a stop/eject switch 151 for the manual operation, a display portion 152 including seven-segment light emitting diodes, a volume control knob 153 in the manual operation, and a cassette tape attaching port 154, etc. The display portion 152 as described above has four digits, and the uppermost digit 155 indicates which of the side A of side B of the cassette tape 101 is being reproduced, while the lower three digits 156 are displayed as a tape counter representing the amount of reproduction of the magnetic tape 122.

Figure 6:
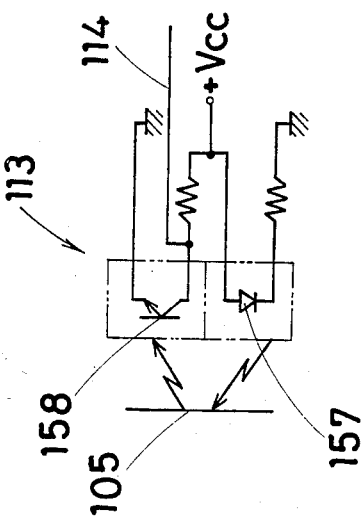
FIG. 6 is a fragmentary circuit diagram showing a detailed circuit construction for an optical detecting means employed in the arrangement of FIG. 4.

In FIG. 6, there is shown a circuit diagram illustrating the detailed circuit construction of the optical detecting means 113 as shown in FIG. 4. The optical detecting means 113 includes a light emitting element 157, for example, of a light emitting diode or the like, and a light receiving element 158, for example, of a phototransistor, etc. The light emitting element 157 is arranged to be normally illuminated during the automatic loading of the cassette tape 101, and light emitted by the light emitting element 157 is reflected by the portion 105 to be detected, with the light thus reflected being received by the light receiving element 158. At this light receiving element 158, current corresponding to the amount of light received is caused to flow, whereby the signal corresponding to the amount of received light is produced in a line 114.

Figure 7:
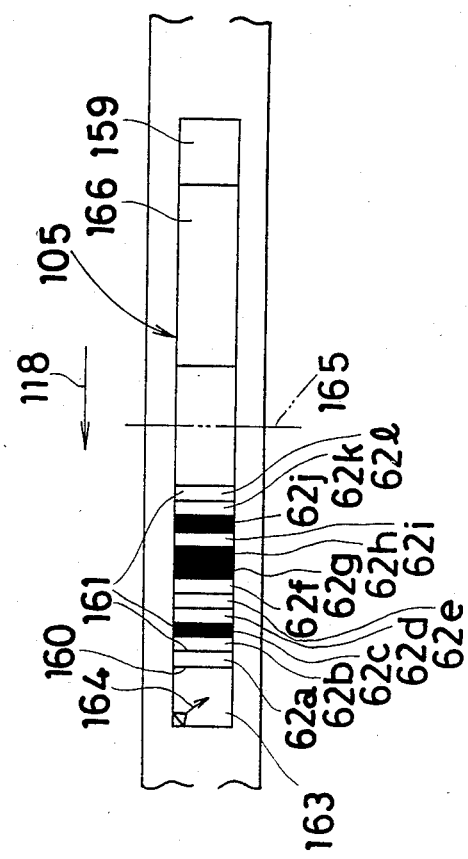
FIG. 7 is a fragmentary front elevational view of a portion to be detected, employed in the arrangement of FIG. 4.

Referring also to FIG. 7 showing a front elevational view of the portion 105 to be detected in FIG. 4, said portion 105 is formed for example, by a tape 159 colored in silver on the surface, and applied or stuck on the cassette half 103 as described earlier. The tape 159 is provided with a plurality of nicks or cuts 161 formed from a starting position 160 to be read out by the optical detecting means 113, at intervals, for example, 1 mm, in a direction at right angles with respect to the direction 118 for movement to mount the cassette tape 101. The control information for the control arrangement 102 during reproduction of the cassette tape 101 is indicated by strips 62a, 62b, 62c, 62d, 62e, 62f, 62g, 62h, 62i, 62j, 62k and 62l each having a width, for example, of 1 mm and formed by the pair of neighboring cuts 161, or combination of these strips 62a to 62l. In FIG. 7, the tape 159 at the left side 163 of the strip 62a to be detected for read-out starting, is peeled off as shown by an arrow 164. At the right side of the strip 62a for read-out starting, i.e. at the downstream side in the mounting direction of the cassette tape 101, there is provided the strip 62b for indicating that the side A of the cassette tape 101 is to be reproduced. For indicating that the side B of the cassette tape 101 is reproduced, the tape 159 at the strip 62b has been peeled off. At the right side of the strip 62b for indicating the side A, the strip 62c for indicating the kind of the magnetic tape 122 is disposed, and for example, in the case of the chrome-oxide tape, the tape 159 has been peeled off so that the surface of the cassette half 103 is exposed as shown at the black portion. At the right side of the strip 62c for indicating the kind of the magnetic tape 122, the strip 62d for showing the state of energization of the noise suppressing circuit 136 is provided. When the noise suppressing circuit 136 is not energized, the tape 159 at the strip 62d to be detected is peeled off. Further, at the right side of the strip 62d for indicating the energization of the noise suppressing circuit 136, there are disposed the three strips 62e to 62g for indicating the recording and reproducing time of the cassette tape 101. On the assumption that the strip 62g to be detected (the black portion in FIG. 7) from which the tape 159 has been peeled off, is represented by the logic "0", and the strips 62e and 62f to be detected at which the tape 159 is applied as it is, are represented by the logic "1", it is found thereby that the recording and reproducing time for this cassette tape 101 is thirty minutes as shown in Table 1 given below.

At the right side of the strips 62e to 62g for indicating the recording and reproducing time for the cassette tape 101, four strips 62h to 62k for indicating the number of musical pieces recorded are disposed. Table 2 below shows the relation between the number of musical pieces and the logical values for the strips 62h to 62k in the similar manner as in Table 1.

TABLE 1

| Recording and reproducing time for cassette tape | Logical values at strips of portion 105 to be detected | | |
|---|---|---|---|
| | 62e | 62f | 62g |
| 30 min. | 1 | 1 | 0 |
| 46 min. | 1 | 1 | 1 |
| 60 min. | 1 | 0 | 1 |
| 90 min. | 1 | 0 | 0 |
| 120 min. | 0 | 0 | 1 |

TABLE 2

| No. of musical pieces | Logical values for strips at portion 105 to be detected | | | |
|---|---|---|---|---|
| | 62h | 62i | 62j | 62k |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| . | . | . | . | . |
| 14 | 1 | 1 | 1 | 0 |
| 15 | 1 | 1 | 1 | 1 |

Accordingly, in the strips 62h to 62k to be detected as shown in FIG. 7, it is seen that five musical pieces are recorded in the side A of the cassette tape 101. At the further right side of the strips 62h to 62k for the number of musical pieces, the strip 62l for completion of read-out is disposed.

With a center line 165 directed at right angles with respect to the direction 118 for attaching movement of the portion 105 being set as a line of symmetry, the reproduction control information for the side B of the cassette tape 101 is indicated in a plurality of strips 166 at a relation symmetrical with respect to the strips 62a to 62l as described earlier.

When the cassette tape 101 applied with the portion 105 is mounted on the reproduction control arrangement 102, the automatic loading mechanism 116 functions, and the cassette tape 101 is moved along the direction 118 for the mounting displacement. In this case, the control information indicated in the strips 62a to 62l or 66 in the portion 105 to be detected is read out by the optical detecting means 113 so as to be applied to the processing unit 106. Accordingly, when the strips 62a to 62l of the portion 105 are read out, the tape kind selection circuit 143 derives the signal corresponding to the chrome-oxide tape by the processing unit 106, while at the switch 130, the common contact 131 and the separate contact 133 are connected to each other, and thus, the noise suppressing circuit 136 is energized. Moreover, at the display control section 146, the indicator lamp 148 corresponding to the chrome-oxide tape, and the indicator lamp 150 are lit, with an indication "A" being given at the lowest digit 155 of the display portion 152.

In addition to the above, at the number of musical piece indicating portion (not particularly shown), the number of musical pieces recorded in the cassette tape 101 is displayed, while at a tape length indicating portion, tape recording and reproducing time such as "C30", "C120", etc. is displayed.

Figure 8:
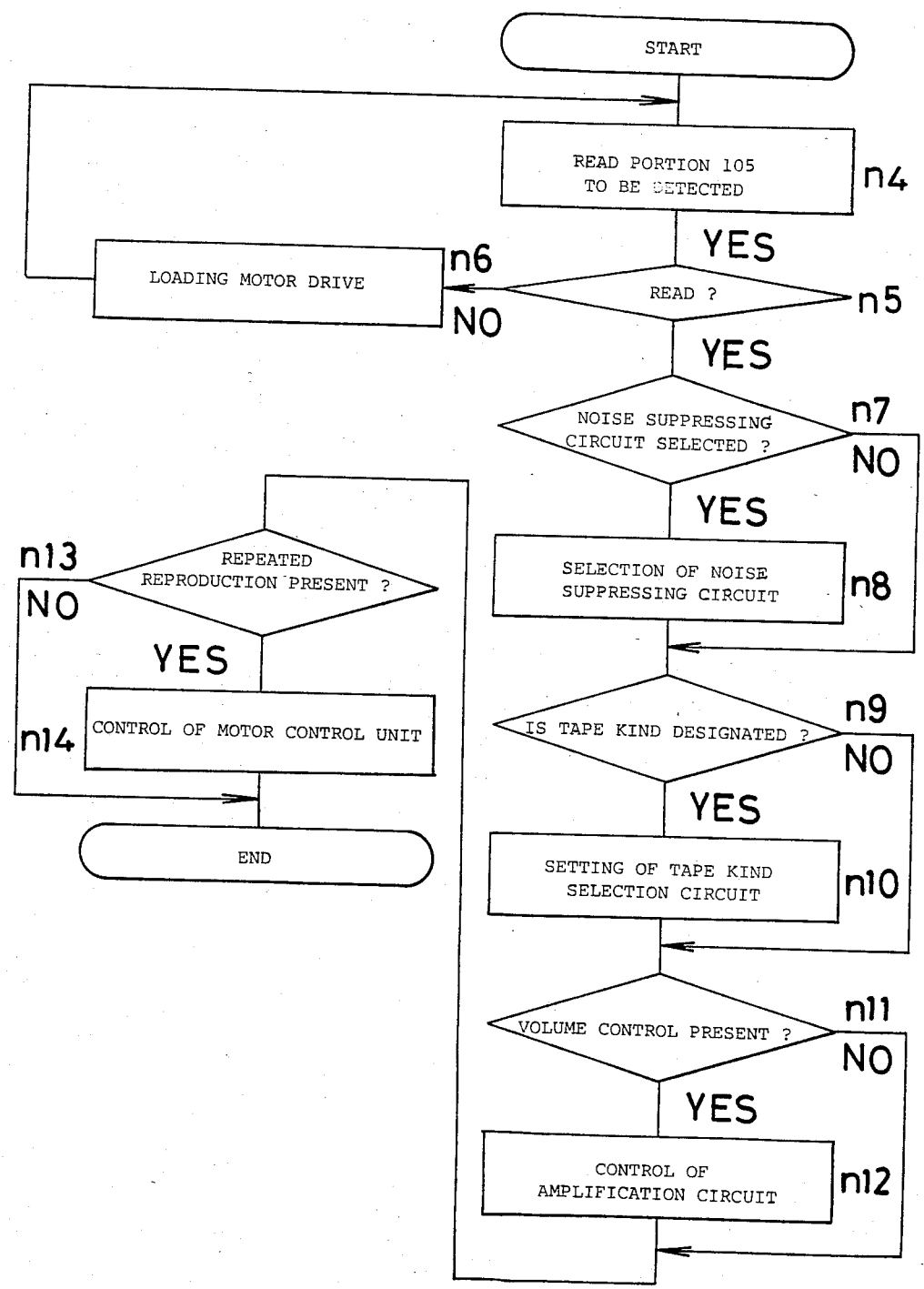
FIG. 8 is a simplified flow-chart explanatory of functions for the control of the tape deck related to the present invention during reproduction of the cassette tape.

In FIG. 8, there is shown a simplified flow-chart for explaining the functions for control of the tape deck during reproduction of the cassette tape 101 according to the present invention.

At a step n4, when the cassette half 103 is inserted into the tape deck for automatic loading by the automatic loading mechanism 116, the information written in the portion 105 to be detected is read out by the optical detecting means 113 and applied to the port 107 for the processing unit 106.

Meanwhile, at a step n5, judgement is made by the processing unit 106, as to whether or not the information of the portion 105 to be detected is correctly input to the port 107. In the case where the information of said portion 105 is not correctly input thereinto, signal is applied, at a step n6, from the port 108 through the line 115, to the automatic loading mechanism 116 so that the loading motor 117 is again driven, whereby the step n4 is repeated once more.

When the information of the portion 105 to be detected is correctly input to the port 107, it is judged, at a step n7, whether or not the noise suppressing circuit 136 is selected by the switch 130 at the processing unit 106, and in the case where said noise suppressing circuit 136 is not selected, the step is transferred to a step n9. At the step n7, upon judgement of selection of the noise suppressing circuit 136, signal is applied from the port 111 to the switch 130 through the line 140 for connecting the common contact 131 with the separate contact 133.

At the step n9, judgement is made as to whether or not the kind of the magnetic tape 122 is designated at the processing unit 106, and thus, at a step n10, signal for selecting the selection mode corresponding to the kind of each magnetic tape 122 is applied from the port 173 to the tape kind selection circuit 143, whereby bias current for the magnetic head 127 is applied from the equalizer circuit 129 according to the kind of the magnetic tape 122.

At a step n11, it is judged whether or not the volume control is required at the processing unit 106, whereby at a step n12, the volume control signal for the speaker 139 is applied from the port 112 to the amplification circuit 135 through the line 141.

At a step n13, judgement is made as to whether or not each recording zone recorded in the magnetic tape 122 is to be repeatedly reproduced at the processing unit 106. If the reproduction is effected repeatedly, the signal is applied, at a step n14, from the port 110 to the motor control unit 125 so as to drive the motor 124 for rotating the reel base detachably fitting thereon the reel 121 of the cassette tape 101 for rotation, whereby the magnetic tape 122 is rewound for the repeated reproduction.

During reproduction of the cassette tape 101, the information obtained by detecting the non-recorded zone formed between the respective recording zones, from the amplification circuit 135 to be applied to the port, and the information of the wound diameter from the file search unit 119 input to the port 109, are applied to the processing unit 106, whereby judgement is made at the processing unit 106, as to which of the recording zones of the magnetic tape 122 is reproduced. According to the result of the judgement, the signals output from the ports 112 and 108 are controlled at steps n12 and n14.

In the foregoing embodiment, although the strip 62c for indicating the kind of the magnetic tape 122 is made of one piece so as to represent two kinds of information, i.e. for the chrome-oxide tape or metal tape, in a further embodiment according to the present invention, it may be so modified that the strip to be detected for indicating the kind of the magnetic tape 122 consists of two pieces so as to indicate four kinds of information for the normal tape, ferro-chrome tape, chrome-oxide tape, and metal tape.

It should be noted here that in the foregoing embodiment, the portion 105 to be detected is formed through employment of the tape 159 colored in silver, in a still another embodiment of the present invention, it may be so arranged that, in the case where the cassette half 103 is in black color, the strips to be detected may be directly drawn at predetermined intervals on the cassette half 103 by using a white paint.

It should also be noted that, in a still further embodiment of the present invention, arrangement may be so made that the volume control information is preliminarily indicated in the portion to be detected so as to impart control signal from the port 112 to the amplification circuit 135 through the line 141 by applying the information to the processing unit 106.

While in the embodiment shown in FIG. 4, cassette tape 101 is attached to or discharged from the cassette deck by the automatic loading mechanism 116, the cassette tape may be attached or discharged by manual operation.

The portion 105 to be detected indicating the reproduction control information may be provided at any place on the surface of the cassette half 1 if it is provided parallel to the displaced direction of the cassette tape.

Figure 9:
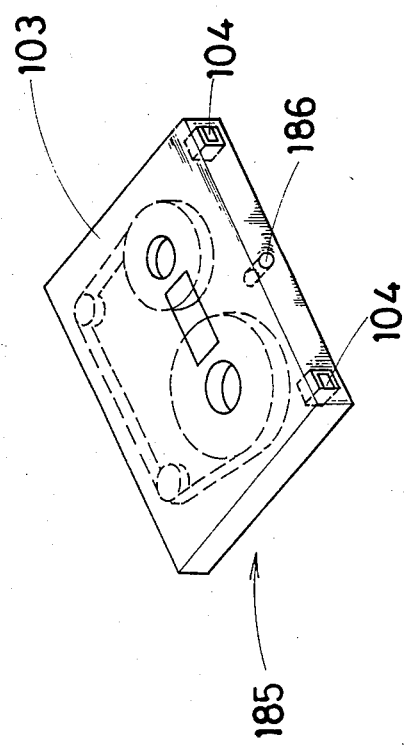
FIG. 9 is a perspective view of a cassette tape showing a further embodiment of the invention.

FIG. 9 is a perspective view of a cassette tape 185 showing another embodiment of the present invention. In this embodiment, the cassette half 103 is provided with a hole or recess 186 for discriminating the kind of tapes in place of the magnetic recording piece 3 or the portion 105 to be detected. The number of the holes or recesses 186 represents the kind of tape, for example, a metal tape cassette is formed with one hole or recess and a ferro-chrome tape cassette is formed with two holes or recesses. The optical detecting means 113 discriminates the presense of the hole or recess 186 and provides a signal to the tape kind selector circuit 143 via the processing unit 106 and the line 142.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A reproduction control arrangement for a cassette tape deck, in which recording and reproduction are performed by a cassette half having the magnetic tape being mounted on the deck, comprising:

a recording area having control information for record/reproduction of the magnetic tape, said recording area being provided on the surface of the cassette half parallel to the direction in which the cassette half is attached to or discharged from the deck, a detecting means for detecting the recording area during the time that the cassette half is being moved on the cassette deck so as to be mounted thereon, said detecting means being positioned at a location facing a cassette half moving course so that detection occurs before completion of mounting of the cassette half on the deck, and a processing unit for controlling reproduction of the cassette tape according to the control information recorded in the recording area.

2. A reproduction control arrangement for a cassette deck as claimed in claim 1, wherein the recording area is a magnetic recording piece attached to the surface of the cassette half, and the detecting means is a magnetic head.

3. A reproduction control arrangement for a cassette tape deck as claimed in claim 2, further comprising;

a means for providing control information to the magnetic recording piece for the purpose of controlling the reproduction of cassette tape during recording of the cassette tape, said means providing the control information to the magnetic recording piece by means of the magnetic head during the cassette tape being discharged.

4. A reproduction control arrangement for a cassette tape deck as claimed in claim 3, further comprising;

a shifting means for displacing cassette tape at a predetermined rate when the cassette tape is mounted on or discharged from the cassette tape deck, and a recording means for recording the control information by discriminating the signal level or the frequency from the detecting means.

5. A reproduction control arrangement for a cassette tape deck as claimed in claim 1, wherein the detecting means is an optical detecting means for emitting light to the recording area and detecting the amount of reflecting light, and the recording area is so arranged that the amount of reflecting light corresponds to the control information.

6. A reproduction control arrangement for a cassette tape deck as claimed in claim 1, further comprising;

a shifting means for displacing the cassette tape for mounting on and discharging from the cassette deck at a predetermined rate.

7. A reproduction control arrangement for a cassette tape deck as claimed in claim 1, further comprising;

a manual operating mechanism for the cassette tape being mounted on and discharging from the cassette deck.

8. A reproduction control arrangement for a cassette tape deck as claimed in claim 5, wherein the recording area is a sheet member fixed to the surface of the cassette half.

9. A reproduction control arrangement for a cassette tape deck as claimed in claim 8, wherein the sheet member is provided with a plurality of cuts formed from a starting position to be read out by the optical detecting means at intervals in a direction at right angles with respect to the direction for movement to mount the cassette tape, and the control information during reproduction of the cassette tape is indicated by strips formed by a pair of neighboring cuts or a combination of these strips.

10. A reproduction control arrangement for a cassette tape deck as claimed in claim 5, wherein the recording area is a hole or a recess formed on the surface of the cassette half for the purpose of determining the kind of cassette tape.

11. A reproduction control arrangement for a cassette tape deck as claimed in claim 5, wherein the recording area has safety tabs formed on the cassette half for the purpose of preventing erroneous recording.

12. A reproduction control arrangement for a cassette tape deck as claimed in claim 11, further comprising a means for inhibiting the magnetic recording on the magnetic tape accommodated in the cassette half when the safety tabs are not detected by the detecting means.

13. A reproduction control arrangement for a cassette tape deck as claimed in claim 2, further comprising;
a shifting means for displacing cassette tape at a predetermined rate when the cassette tape is mounted on or discharged from the cassette tape deck, and
a recording means for recording the control information by discriminating the signal level or the frequency from the detecting means.

14. A reproduction control arrangement for a cassette deck, in which recording and reproduction are performed by a cassette half having the magnetic tape being mounted on the deck, comprising;
a recording area having control information for record/reproduction of the magnetic tape,
said recording area being provided on the surface of the cassette half parallel to the direction in which the cassette half is attached to or discharged from the deck,
a detecting means for detecting the recording area during the time that the cassette half is being mounted on the cassette deck, and
a processing unit for controlling the reproduction of the cassette tape according to the control information recorded in the recording area;
wherein the recording area is a magnetic recording piece attached to the surface of the cassette half, and the detecting means is a magnetic head.

15. A reproduction control arrangement for a cassette tape deck as claimed in claim 14, further comprising;
a means for providing control information to the magnetic recording piece for the purpose of controlling the reproduction of cassette tape during recording of the cassette tape,
said means providing the control information to the magnetic recording piece by means of the magnetic head during the cassette tape being discharged.

16. A reproduction control arrangement for a cassette tape deck as claimed in claim 14, further comprising;
a shifting means for displacing cassette tape at a predetermined rate when the cassette tape is mounted on or discharged from the cassette tape deck, and
a recording means for recording the control information by discriminating the signal level or the frequency from the detecting means.

17. A reproduction control arrangement for a cassette deck, in which recording and reproduction are performed by a cassette half having the magnetic tape being mounted on the deck, comprising;
a recording area having control information for record/reproduction of the magnetic tape,
said recording area being provided on the surface of the cassette half parallel to the direction in which the cassette half is attached to or discharged from the deck,
a detecting means for detecting the recording area during the time that the cassette half is being mounted on the cassette deck, and
a processing unit for controlling the reproduction of the cassette tape according to the control information recorded in the recording area;
wherein the detecting means is an optical detecting means for emitting light to the recording area and detecting the amount of reflecting light, and the recording area is so arranged that the amount of reflecting light corresponds to the control information.

18. A reproduction control arrangement for a cassette tape deck as claimed in claim 17, further comprising;
a shifting means for displacing the cassette tape for mounting on and discharging from the cassette deck at a predetermined rate.

19. A reproduction control arrangement for a cassette tape deck as claimed in claim 17, further comprising;
a manual operating mechanism for the cassette tape being mounted on and discharging from the cassette deck.

20. A reproduction control arrangement for a cassette tape deck as claimed in claim 17, wherein the recording area is a sheet member fixed to the surface of the cassette half.

21. A reproduction control arrangement for a cassette tape deck as claimed in claim 20, wherein the sheet member is provided with a plurality of cuts formed from a starting position to be read out by the optical detecting means at intervals in a direction at right angles with respect to the direction for movement to mount the cassette tape, and the control information during reproduction of the cassette tape is indicated by strips formed by a pair of neighboring cuts or a combination of these strips.

22. A reproduction control arrangement for a cassette tape deck as claimed in claim 17, wherein the recording area is a hole or a recess formed on the surface of the cassette half for the purpose of determining the kind of cassette tape.

23. A reproduction control arrangement for a cassette tape deck as claimed in claim 17, wherein the recording area has safety tabs formed on the cassette half for the purpose of preventing erroneous recording.

24. A reproduction control arrangement for a cassette tape deck as claimed in claim 23, further comprising a means for inhibiting the magnetic recording on the magnetic tape accommodated in the cassette half when the safety tabs are not detected by the detecting means.

25. A reproduction control arrangement for a cassette tape deck, in which recording the reproduction are performed by a cassette half having the magnetic tape being mounted on the deck, comprising;
a recording area having control information for record/reproduction of the magnetic tape,
said recording area being provided on the surface of the cassette half parallel to the direction in which the cassette half is attached to or discharged from the deck,
a detecting means for detecting the recording area during the time that the cassette half is being moved on the cassette deck so as to be mounted thereon, said detecting means being positioned at a location facing a cassette half moving course so that detection occurs before completion of mounting of the cassette half on the deck;

further comprising:

a means for providing control information to the magnetic recording piece for the purpose of controlling the reproduction of cassette tape during recording of the cassette tape, said means providing the control information to the magnetic recording piece by means of the magnetic head during the cassette tape being discharged.

* * * * *